United States Patent [19]

Suzuki et al.

[11] Patent Number: 4,795,687
[45] Date of Patent: Jan. 3, 1989

[54] ELECTRICALLY CONDUCTIVE MATERIAL AND A PROCESS FOR THE PREPARATION OF SAME AND SECONDARY BATTERY USING THE ELECTRICALLY CONDUCTIVE MATERIAL

[75] Inventors: Tetsumi Suzuki, Isehara; Kazumi Hasegawa, Yokohama; Osamu Ando, Kawasaki; Nobuhiro Furukawa; Koji Nishio, both of Hirakata, all of Japan

[73] Assignee: Mitsubishi Kasei Corp., Tokyo, Japan

[21] Appl. No.: 93,032

[22] Filed: Sep. 4, 1987

[30] Foreign Application Priority Data

Sep. 12, 1986 [JP] Japan .................................. 61-215295
Sep. 12, 1986 [JP] Japan .................................. 61-215296
Sep. 12, 1986 [JP] Japan .................................. 61-215297
Sep. 12, 1986 [JP] Japan .................................. 61-215298
Oct. 14, 1986 [JP] Japan .................................. 61-243797

[51] Int. Cl.$^4$ .............................................. H01M 4/60
[52] U.S. Cl. ..................................... 429/213; 252/500; 252/182.1; 528/423
[58] Field of Search .............. 429/213; 252/500, 182.1; 528/423

[56] References Cited

U.S. PATENT DOCUMENTS 4,547,439 10/1985 Genies .................................. 429/213
4,604,427 8/1986 Roberts et al. ..................... 252/500
4,696,835 9/1987 Maus et al. ......................... 252/500
4,697,000 9/1987 Witucki et al. ..................... 252/500

FOREIGN PATENT DOCUMENTS 1216549 12/1970 United Kingdom ................ 429/213

*Primary Examiner*—Donald L. Walton
*Attorney, Agent, or Firm*—Wenderoth, Lind & Ponack

[57] ABSTRACT

New electrically conductive material suitable particularly for a secondary battery and a process for preparing the electrically conductive material are provided. The process for the preparation of the electrically conductive material comprises the steps of reacting a compound having conjugated double bonds with an oxidizing agent wherein the oxidizing agent comprises a cupric compound and a nitrile compound. The electrically conductive material comprises grainy polypyrrole obtained by reacting a pyrrole compound with an oxidizing agent which is constituted by primary particles having an average particle size of 0.01 to 0.4 μm and has a press molding density of 1 to 1.6 g/cm$^3$.

15 Claims, 2 Drawing Sheets

ELECTRICALLY CONDUCTIVE MATERIAL AND A PROCESS FOR THE PREPARATION OF SAME AND SECONDARY BATTERY USING THE ELECTRICALLY CONDUCTIVE MATERIAL

BACKGROUND OF THE INVENTION

The present invention relates generally to an electrically conductive material adaptable particularly for a secondary battery and more particularly to an electrically conductive material comprising a polymer having conjugated double bonds, characterized by the use of a specific oxidizing agent comprising a cupric compound and a nitrile compound and a process for the preparation of the electrically conductive material, and to a secondary battery using this type of electrically conductive material.

It is known that polymers having conjugated double bonds in the main chain such as polyacetylene, poly-p-phenylene, polythienylene, polypyrrole, poly-p-phenylene-vinylene and polyaniline are remarkably improved in electric conductivity when they are treated with a P- or N-type doping agent such as arsenic pentafluoride, antimony pentafluoride, iodine, bromine, sulfur trioxide, n-butyllithium or sodium naphthalene, whereby they are changed from an insulator to a semiconductor or a conductor. These electrically conductive materials, so-called "electrically conductive polymers", are obtained in the form of powder, grain, bulk or film, which is used either as such or after molding thereof in accordance with the purpose of use thereof. They are now under investigation for application thereof to a wide variety of fields involving functional elements such as an antistatic material, an electromagnetic wave shielding material, a photoelectric conversion element (electron-light functional element), an optical memory (holographic memory) and various sensors; display element (electrochromism); a switch; various hybrid materials (transparent conductive film and the like) and various terminal equipment.

Among the above various electrically conductive polymers, polythienylene, polypyrrole and polyaniline are more stable in air than polyacetylene and thus hardly undergo oxidative deterioration, and are easily handled. Therefore, they are under investigations for application to various uses wherein these characteristics are effectively utilized.

Known process for the preparation of polythienylene, polypyrrole or polyaniline includes (1) electrochemical oxidation polymerization process (electrolytic polymerization process), (2) chemical oxidation polymerization process using an oxidizing agent and so on. According to the process (1), a film of polythienylene, polypyrrole or polyaniline is obtained by depositing polythienylene, polypyrrole or polyaniline in the form of a film on the anode used in the electrolytic polymerization and peeling it from the anode. According to the process (2), powdery polypyrrole is obtained by solid-phase, liquid-phase or gas-phase oxidation polymerization using an oxidizing agent, for example, peroxide such as potassium persulfate or ammonium persulfate, acid such as nitric, sulfuric or chromic acid or Lewis acid such as ferric trichloride, ruthenium chloride, tungsten chloride or molybdenum chloride. Further, it has been proposed in, for example, Mol. Cryst. Liq. Cryst. 1985, vol. 118, P.P. 149–153 that powdery polypyrrole similar to the one above obtained is obtained by oxidation polymerization using ferric perchlorate as an oxidizing agent in an organic solvent.

However, the above process (1) has disadvantages in that a film of polythienylene, polypyrrole or polyaniline is formed on the anode, so that the size of the film is restricted by the size of the electrode, which restricts the application of the process to mass production and that the electrolytic polymerization process itself is complicated, thus resulting in high cost.

On the other hand, although the process (2) is free from the disadvantages described above with respect to the process (1), it has other disadvantage in that the polythienylene, polypyrrole or polyaniline prepared by the process exhibits a so poor electric conductivity that the application field thereof is restricted.

Further, the process (2) wherein the oxidation polymerization is carried out in an organic solvent by using ferric perchlorate as an oxidant has a disadvantage in that the solubility of ferric perchlorate in an organic solvent is so much smaller than that in water that the application of the process to mass production is disadvantageously restricted, while the obtained polypyrrole exhibits a very low electric conductivity, because the concentration of a doping agent in the solvent is reduced by a decrease in the solubility. Additionally, the process has another disadvantage in that the obtained grainy polypyrrole comprises bulky primary particles having a diameter of 1 $\mu$m or above. Therefore, the grainy polypyrrole causes scattering of dust and can not be easily handled in the following molding step, which is varied depending upon its use, owing to its small press molding density, so that the production of a high-density molded product from the polypyrrole is difficult to hardly obtain a material having a high electric conductivity. Still additionally, the process has another disadvantage in that various safety measures must be adopted in the production, since the process requires the use of an organic solvent which is in high danger of explosion or the like.

On the other hand, there has recently been proposed a secondary battery prepared by using an electrically conductive polymer comprising various organic materials as the electrode material.

Although such an electrically conductive polymer as used as an electrode material usually has a slight electric conductivity, the electric conductivity thereof can be dramatically increased by doping, since it can be doped with a dopant such as any one of various anions and cations, or can be undoped. In constituting a secondary battery with such an electrically conductive polymer as the electrode material, an electrically conductive polymer capable of being doped with anions is used as the anode material, and an electrically conductive material capable of being doped with cations is used as the cathode material, while such a solution containing a dopant as mentioned above is used as the electrolytic solution. Thus, there can be produced a secondary battery capable of charging and discharging via electrochemically reversible doping and undoping.

Known electrically conductive polymer of such kind as described above includes polyacetylene, polythiophene, polypyrrole and polyaniline. In an instance of polyacetylene, it is used as the electrode material for at least one of the anode and the cathode, while anions such as $BF_4^-$, $ClO_4^-$, $SbF_6^-$ or $PF_6^-$ or cations such as $Li^+$, $Na^+$ or $R_4-N^+$ (wherein R represents an alkyl group) are employed to constitute an electrochemically reversible system capable of doping and undoping.

However, among this type of electrically conductive polymers, polyacetylene has a disadvantage in that it is very easily oxidized with oxygen in air in any state of doped and undoped states. Therefore, when polyacetylene is used as an electrode material, there have arisen such problems that the working atmosphere of electrode production must be controlled so severely that electrode production is difficult and complicated and that the obtained electrode itself is poor in preservability. Further, a battery using such an electrode as thus prepared has disadvantages in that the electrode is deteriorated or decomposed by the presence of only slight amounts of oxygen and water to lower battery characteristics, that the polymer tends to be deteriorated or decomposed by excessive charging and that the battery causes a rapid increase in charging voltage, a decrease in charging and discharging efficiency and a decrease in cycle life. Thus, polyacetylene is unsuitable as an electrode material.

Among the above various electrically conductive polymers, polythiophene, polypyrrole and polyaniline are more stable in air than polyacetylene and therefore hardly undergo oxidative deterioration, and are easily handlable. Therefore, when they are used as an electrode material of a battery, an electrode excellent in preservability can be easily produced without causing any of such disadvantages and problems are caused when polyacetylene is used.

However, the use of a film of polythiophene, polypyrrole or polyaniline prepared by electrochemical oxidation polymerization (electrolytic polymerization) has problems in that the production process is complicated and results in high battery production cost and in that the size and shape of the film are restricted by those of the electrode, since the polymer is formed on the electrolysis anode, so that it is difficult to mold the film into a required size which varies depending upon the kind of a battery. Further, since it is difficult according to the electrochemical oxidation polymerization to obtain a thick and uniform film with a high reproducibility, only a thin film thereof can be utilized as an industrial battery material. Thus, the use of such a thin film has a disadvantage in that the charging and discharging capacities of the electrode itself and the battery are so restricted that the enhancement of the capacities are nearly impossible.

On the other hand, although the use of polythiophene, polypyrrole or polyaniline prepared by chemical oxidation polymerization using an oxidizing agent is free from the above disadvantages, such a polymer exhibits a low electric conductivity, so that a secondary battery using the polymer as an electrode material causes ununiform charging and discharging reaction over the electrode with an increase in the internal resistance of the battery. Therefore, the charging voltage tends to be increased by repeating the charging and discharging cycles and the increased charging voltage causes decomposition of the electrolyte which disadvantageously leads to significant deterioration of the battery characteristics.

Further, polypyrrole prepared by chemical oxidation polymerization has a disadvantage in that the press molding density thereof can not sufficiently be enhanced, so that an electrode obtained by press molding the polypyrrole exhibits a low energy density owing to its low density. On the other hand, the production of a battery having a sufficiently high capacity by the use of an electrode made of the polypyrrole necessitates an electrode having an enlarged volume which is a barrier against miniaturization of a battery.

SUMMARY OF THE INVENTION

An object of the present invention is to provide a process for the preparation of an electrically conductive material comprising a polymer having conjugated double bonds, wherein the process comprises reacting a compound having conjugated double bonds with a specific oxidizing agent and wherein this type of electrically conductive material which is free from the above disadvantages or problems, is stable in air and exhibits a high electric conductivity and excellent properties of resistance to oxidation can be easily prepared at a high reaction rate and in a high yield.

Another object of the present invention is to provide an economically advantageous process for the preparation of an electrically conductive material comprising a polymer having conjugated double bonds which comprises reacting a compound having conjugated double bonds with a specific oxidizing agent, wherein the cupric compound used as one component of the specific oxidizing agent is regenerated, recycled and reused.

Another object of the present invention is to provide an electrically conductive material exhibiting a high electric conductivity which comprises grainy polypyrrole constituted by primary particles each having a specified particle size and having a high press molding density and therefore is easily handlable in the molding step to give a high-density molded product.

Another object of the present invention is to provide a secondary battery using this type of electrically conductive material which has advantages in that the deterioration of the battery characteristics due to ununiform charging and discharging reaction over the electrode is slight, that the charging and discharging efficiency and the cycling life of the battery and the preservability of the electrode are improved, that the charging and discharging capacities of the electrode and the battery are not restricted and that the working atmosphere of the electrode production can be easily controlled.

Still another object of the present invention is to provide a secondary battery as described above which has still another advantage in that the energy density of the electrode is improved to thereby attain the maniaturization and thickness reduction of the battery and the enhancement of the discharging performance of the battery.

In order to attain the above objects, the present invention provides a process for the preparation of an electrically conductive material comprising a polymer having conjugated double bonds which comprises reacting a compound having conjugated double bonds with an oxidizing agent, wherein said oxidizing agent comprises a cupric compound and a nitrile compound.

The cupric compound to be used in the present invention include those represented by the general formula:

$$CuX_m \quad (1)$$

wherein X stands for $ClO_4^-$, $BF_4^-$, $AsF_6^-$, $SbF_6^-$, $CH_3C_6H_4SO_3^-$, $CF_3SO_3^-$, $ZrF_6^{--}$, $TiF_6^{--}$ or $SiF_6^{--}$ and m stands for an integer of 1 to 2.

Particular examples of the cupric compound represented by the general formula (1) include $Cu(ClO_4)_2$, $Cu(BF_4)_2$, $Cu(PF_6)_2$, $Cu(AsF_6)_2$, $Cu(SbF_6)_2$, $Cu(CH_3C_6H_4SO_3)_2$, $Cu(CF_3SO_3)_2$, $CuZrF_6$, $CuTiF_6$ and CuSiF₆, which are each used as a compound having water of crystallization or an aqueous solution.

The nitrile compound to be used in the present invention includes those represented by the general formula:

$$R(CN)_n \qquad (2)$$

wherein R stands for an alkyl, alkenyl or aryl group which may be substituted and n stands for an integer of 1 to 3.

Particular examples of the R of the general formula (2) include methyl, ethyl, n-propyl, isopropyl, n-butyl, isobutyl, sec-butyl, tert-butyl, vinyl, methylvinyl, dimethylvinyl, ethylvinyl, diethylvinyl, n-propylvinyl, n-butylvinyl, phenylvinyl, naphthylvinyl, hydroxymethyl, hydroxyethyl, hydroxypropyl, hydroxybutyl, methoxymethyl, methoxyethyl, methoxypropyl, ethoxymethyl, ethoxyethyl, cyanomethyl, cyanoethyl, cyanopropyl, cyanobutyl, cyanopentyl, cyanohexyl, carboxymethyl, carboxyethyl, carboxypropyl, phenyl, naphthyl, tolyl, hydroxyphenyl, hydroxynaphthyl, methoxyphenyl, ethoxyphenyl, methoxynaphthyl, cyanophenyl, dicyanophenyl, cyanotolyl, dicyanotolyl, cyanonaphthyl, carboxyphenyl and carboxytolyl, groups. Particular examples of the nitrile compound represented by the general formula (2) include acetonitrile, n-propionitrile, isopropionitrile, n-butyronitrile, isobutyronitrile, tert-butyronitrile, acrylonitrile, methylacrylonitrile, ethyl-acrylonitrile, phenylacrylonitrile, acetone cyanohydrin, methylene cyanohydrin, ethylene cyanohydrin, propylene cyanohydrin, methoxyacetonitrile, ethoxyacetonitrile, methoxypropionitrile, malonodinitrile, adiponitrile, cyanoacetic acid, cyanopropionic acid, cyanobutyric acid, benzonitrile, naphthonitrile, methylbenzonitrile, hydroxybenzonitrile, phthalonitrile, tricyanobenzene, methoxybenzonitrile and carboxybenzonitrile.

The compound having conjugated double bonds to be used in the present invention includes thiophene and pyrrole compounds represented by the general formula:

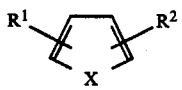

wherein R¹ and R² each stand for a hydrogen atom or an alkyl, alkoxy, aryl, aryloxy, amino, alkylamino or arylamino group; X stands for S or NR³ and R³ stands for a hydrogen atom or an alkyl or aryl group Among the thiophene and pyrrole compounds represented by the general formula (3), those not having any substituent at position 2 nor 5 of the five-membered ring are preferred. Particular examples of the R¹ or R² include hydrogen atom and methyl, ethyl, n-propyl, isopropyl, n-butyl, isobutyl, secbutyl, tert-butyl, methoxy, ethoxy, n-propoxy, isopropoxy, n-butoxy, phenyl, tolyl, naphthyl, phenoxy, methylphenoxy, naphthoxy, amino, dimethylamino, diethylamino, phenylamino, diphenylamino, methylphenylamino and phenylnaphthylamino groups. On the other hand, X stands for S or NR³ and particular examples of the R³ include hydrogen atom and methyl, ethyl, n-propyl, isopropyl, n-butyl, isobutyl, sec-butyl, tert-butyl, phenyl, tolyl and naphthyl groups.

The compound having conjugated double bonds also includes aniline compounds represented by the general formula:

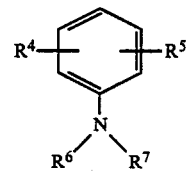

wherein R⁴ and R⁵ each stand for a hydrogen atom or an alkyl, alkoxy, aryl, aryloxy, amino, alkylamino or arylamino group and R⁶ and R⁷ each stand for a hydrogen atom or an alkyl or aryl group.

The above compound having conjugated double bonds still also include bi- and ter-thiophene compounds represented by the general formula:

or

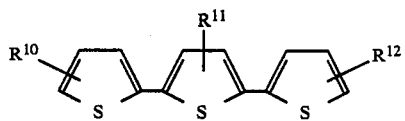

hwerein R⁸, R⁹, R¹⁰, R¹¹ and R¹² each stand for a hydrogen atom or an alkyl, alkoxy, aryl, aryloxy, amino, alkylamino or arylamino group.

Particular examples of the above thiophene compound include thiophene, 3-methylthiophene, 3-ethylthiophene, 3-n-propylthiophene, 3-isopropylthiophene, 3-n-butylthiophene, 3-isobutylthiophene, 3-sec-butylthiophene, 3-tert-butylthiophene, 3-methoxythiophene, 3-ethoxythiophene, 3-n-propoxythiophene, 3-n-butoxythiophene, 3-phenylthiophene, 3-tolylthiophene, 3-naphthylthiophene, 3-phenoxythiophene, 3-methylphenoxythiophene, 3-naphthoxythiophene, 3-aminothiophene, 3-dimethylaminothiophene, 3-diethylaminothiophene, 3-diphenylaminothiophene, 3-methylphenylthiophene and 3-phenylnaphthylthiophene.

Particular examples of the above pyrrole compound include pyrrole, N-methylpyrrole, N-ethylpyrrole, N-phenylpyrrole, N-naphthylpyrrole, N-methyl-3-methylpyrrole, N-methyl-3-ethylpyrrole, N-phenyl-3-methylpyrrole, N-phenyl-3-ethyl-pyrrole, 3-methylpyrrole, 3-ethypyrrole, 3-n-propylpyrrole, 3-isopropylpyrrole, 3-n-butylpyrrole, 3-methoxypyrrole, 3-ethoxypyrrole, 3-n-propoxypyrrole, 3-n-butoxypyrrole, 3-phenylpyrrole, 3-tolylpyrrole, 3-naphthylpyrrole, 3-phenoxypyrrole, 3-methylphenoxypyrrole, 3-aminopyrrole, 3-dimethylaminopyrrole, 3-diethylaminopyrrole, 3-diphenylaminopyrrole, 3-methylophenylaminopyrrole and 3-phenoxynaphthylaminopyrrole.

Particular examples of the R⁴ or R⁵ of the general formula (4) include hydrogen atom and methyl, ethyl, n-propyl, isopropyl, n-butyl, isobutyl, sec-butyl, tert-butyl, methoxy, ethoxy, n-propoxy, n-butoxy, phenyl, tolyl, naphthyl, phenoxy, methylphenoxy, naphthoxy, amino, dimethylamino, diethylamino, phenylamino, diphenylamino, methylphenylamino and phenylnaphthylamino groups, while those of the R⁶ or R⁷ of the general formula (4) include hydrogen atom and methyl, ethyl, n-propyl, isopropyl, n-butyl, phenyl, tolyl and naphthyl groups.

Particular examples of the aniline compound represented by the general formula (4) include aniline, methylaniline, ethylaniline, n-propylaniline, isopropylaniline, n-butylaniline, methoxyaniline, ethoxyaniline, n-propoxyaniline, phenylaniline, tolylaniline, naphthylaniline, phenoxyaniline, methylphenoxyaniline, naphthoxyaniline, aminoaniline, dimethylaminoaniline, diethylaminoaniline, phenylaminoaniline, diphenylaminoaniline, methylphenylaminoaniline and phenylnaphthylaminoaniline.

Particular examples of the $R^8$, $R^9$, $R^{10}$, $R^{11}$ or $R^{12}$ of the general formula (5) or (6) include hydrogen atom and methyl, ethyl, n-propyl, isopropyl, n-butyl, isobutyl, sec-butyl, tert-butyl, methoxy, ethoxy, n-propoxy, n-butoxy, phenyl, tolyl, naphthyl, phenoxy, methylphenoxy, naphthoxy, amino, dimethylamino, diethylamino, diphenylamino, methylphenylamino and phenylnaphthylamino groups.

Particular examples of the bi- or ter-thiophene compound represented by general formula (5) or (6) include 2,2'-bithiophene, 3-methyl-2,2'-bithiophene, 3-ethyl-2,2'-bithiophene, 4-n-propyl-2,2'-bithiophene, 3-methyl-3'-methyl-2,2'-bithiophene, 3-methoxy-2,2'-bithiophene, 3-ethoxy-2,2'-bithiophene, 3-phenyl-2,2'-bithiophene, 3-phenoxy-2,2'-bithiophene, 3-amino-2,2'-bithiiophene, 3-dimethylamino-2,2'-bithiophene, 3-diethylamino-2,2'-bithiophene, 2,2',5',2''-terthiophene, 3-methyl-2,2',5',2''-terthiophene and 3-methyl-3'-methyl-2,2', 5',2''-terthiophene.

According to the present invention, one or more compounds having conjugated double bonds are reacted with an oxidizing agent comprising one or more cupric compounds and one or more nitrile compounds.

The amount of the cupric compound represented by the general formula (1) is used in an amount of 0.01 to 100 mol, preferably 0.1 to 50 mol, per mol of the compound having conjugated double bonds.

Although the nitrile compound represented by the general formula (2) is used in a state coexistent with the above cupric compound, the usage thereof is, for example, as follows:

(1) a compound having conjugated double bonds is made to react with a system wherein a nitrile compound and a cupric compound are coexistent, (2) a cupric compound is made to react with a system wherein a compound having conjugated double bonds and a nitrile compound are coexistent, (3) a nitrile compound is made to react with a system wherein a compound having conjugated double bonds and a cupric compound are coexistent, (4) a system wherein a cupric compound and a nitrile compound are coexistent is made to react with a system wherein a compound having conjugated double bonds and a nitrile compound are coexistent, or (5) a reaction product between a cupric compound and a nitrile compound which has been isolated is made to react with a compound having conjugated double bonds.

It has now been found that the coexistence of a nitrile compound so accelerates the oxidative polymerization of a compound having conjugated double bonds with an oxidizing agent as to facilitate the proceeding of such oxidation polymerization that substantially hardly proceeds according to the prior art.

The nitrile compound represented by the general formula (2) is used in an amount of 0.01 to 10,000 mol, preferably 0.1 to 1,000 mol, per mol of the cupric compound used.

When the nitrile compound is liquid, it may be used as a reaction solvent, while when the nitrile compound is solid, an ordinary solvent, for example, water, alcoholic solvent such as methanol or ethanol, tetrahydrofuran, dioxane, benzene, toluene, dichloromethane, dichloroethane or acetic acid may be used.

The reaction temperature is from $-50°$ to $150°$ C., preferably from $-20°$ to $100°$ C., while the reaction time is generally 0.5 to 200 hours, preferably 1.0 to 100 hours, though it varies depending upon the reaction temperature.

The reaction of the cupric compound represented by the general formula (1) with, for example, the thiophene or pyrrole represented by the general formula (3) is preferably carried out in a liquid phase, though it may be carried out in any one of solid, liquid and gas phases.

The reaction product is a powder of from dark brown to black. When the reaction is carried out in the presence of a solvent, it is preferred to obtain a product having a further enhanced electric conductivity by removing the solvent from the reaction mixture by an ordinary method and washing the reaction product with a liquid nitrile compound such as acetonitrile or propionitrile or the like several times to thereby dissolve and remove the cuprous compound formed as a byproduct.

Further, after the reaction of the compound having conjugated double bonds represented by the general formula (3), (4), (5) or (6) with an oxidizing agent comprising a cupric compound and a nitrile compound, the formed electrically conductive material is separated from the reaction mixture, while the remaining residue containing a cuprous compound may be subjected to oxidative regeneration to thereby convert the cuprous compound into the corresponding cupric compound, and recycled and reused. The oxidative regeneration of the residue may be carried out by, for example, a process of adding a compound having an oxidizing power, for example, peroxide such as hydrogen peroxide or benzoyl peroxide; permanganate such as potassium permanganate or sodium permanganate or dichromate such as potassium dichromate or sodium dichromate to the residue or a process of contacting the residue with an oxygen-containing a gas such as oxygen or air. The latter is preferred.

The regeneration is carried out at a temperature of from $30°$ to $150°$ C., preferably $40°$ to $100°$ C. for 0.1 to 50 hours, preferably 0.5 to 30 hours.

When an electrically conductive material is prepared by the oxidative polymerization of a compound having conjugated double bonds with an oxidizing agent comprising a cupric compound and a nitrile compound, a reaction by which the cupric compound which is one component of the oxidizing agent is converted into the corresponding cuprous compound occurs simultaneously, so that the oxidizing power of the oxidizing agent is lowered or lessened with generation of the electrically conductive material. Therefore, when such an electrically conductive material as described above is mass-produced by the oxidative polymerization on an industrial scale, a large amount of an oxidizing agent must be used, which is economically disadvantageous. However, the above oxidative regeneration of the residue allows the recycle and reuse of the cupric compound to enable the mass-production of an electrically conductive material with a small amount of an oxidizing agent, which is economically advantageous.

The reaction product is an electrically conductive material which comprises agglomerate of various shapes constituted by primary particles having an average particle size of 0.01 to 0.4 μm, preferalby 0.02 to 0.35 μm. Particularly, the press molding density of the agglomerate is preferably 1 to 1.6 g/cm³, still preferably 1.1 to 1.5 g/cm³.

The agglomerate of primary particles has a structure wherein primary particles are combined in one-, two- or three-dimentions and each in an arbitrary length, so that it has various shapes such as linear, branched or amorphous shape. The primary particrles constituting the agglomerate is smaller than that of the primary particle constituting the electrically conductive material of the prior art, so that the void among the primary particles is reduced by press molding to give a molded product having a density higher than that of the molded product of the prior art. Thus, a material having an improved electric conductivity is obtained. Further, since the weight of the material which can be packed per unit volume is so large that the energy density is also improved.

On the other hand, to attain the above objects, the present invention provides a secondary battery using an electrically conductive material prepared by reacting a compound having conjugated double bonds with an oxidizing agent as at least one of the anode and the cathode, wherein said oxidizing agent comprises a cupric compound and a nitrile compound.

The use of an electrically conductive material obtained by the above process as an electrode material brings about advantages as follows: The control of the working atmosphere of electrode production is extremely facilitated to given an electrode having an improved preservability. The charging and discharging capacities of the electrode and the battery are not restricted and the deterioration of battery characteristics due to ununiformness of charging and discharging reaction over the electrode is so slight that the cycling characteristics of the battery is extremely improved. Further, since the molded product of this material has a high density, the electrode made thereof has an improved energy density. Therefore, miniaturization or thickness reduction of an electrode or battery having predetermined charging and discharging performance is attained. Thus, the weight of an electrically conductive material which can be packed per unit electrode volume is so large that the discharging performance of the battery is also improved.

According to the present invention, an electrically conductive material as described above is molded into a desired shape by an ordinary process such as press molding and used as an electrode of a secondary battery. In this case, although such an electrically conductive material may be used alone, it is preferable to add a thermoplastic resin, a suitable electrically conductive material other than the reaction product according to the present invention or the like in order to improve the mechanical strength and electric conductivity of the electrode, thus improving the battery characteristics. The thermoplastic resin to be used for this purpose may be any resin as far as it is substantially insoluble in the electrolyte of the battery. Generally, thermoplastic resin having a molecular weight of 10,000 or above is used. Particular examples thereof include polyethylene, polypropylene, ethylene-propylene copolymers, ethylene-tetrafluoroethylene copolymers, polytetrafluoroethylen, polytrifluoroethylene, polydifluoroethylene, tetrafluoroethylene-perfluoroalkyl vinyl ether copolymers, tetrafluoroethylene-hexafluoropropylene copolymers, polytrifluorochloroethylene, polyvinylidene fluoride, tetrafluoroethylene-ethylene copolymers, chlorotrifluoroethylene-ethylene copolymers, polyamide, polyester, polycarbonate and modified olefins.

The above electrically conductive material other than the reaction product according to the present invention may be any one made of a substance which is insoluble even by repeating the charging and discharging of the battery, for example, metal such as stainless steel, gold, platinum, nickel, copper, molybdenum or titanium, carbon or carbon fiber, though those having a low specific gravity and a high electric conductivity are particularly preferred. Particular examples thereof include nets of the above metals, metal-plated fibers, fibers covered with deposited metal, metal-containing synthetic fibers and nets and woven and nonwoven fabrics made of carbon fiber or conjugate fibers containing carbon fiber.

The amounts of the thermoplastic resin and the electrically conductive material other than the reaction product according to the present invention to be added are preferably 0.02 to 1000 parts by weight and 2 to 100 parts by weight respectively per 100 parts by weight of the reaction product (organic semiconductor).

In the secondary battery of the present invention, there are an embodiment wherein electrodes made of the above mentioned electrically conductive material are used as the anode and cathode, and an embodiment wherein an electrode made of the above mentioned electrically conductive material is used as one of the two electrodes, while the other electrode uses an electrode material selected from among metals, metal oxides, other inorganic compounds, known electrically conductive polymers and organic compounds other than the reaction product according to the present invention, and organometallic compounds. As an example, in the embodiment wherein the above mentioned electrically conductive material is used only in the anode, while a metal is used as the electrode material of the cathode, the metal constituting the cathode has preferably an electronegativity of 1.6 or less. Examples of metals having such an electronegativity include Li, Na, K, Mg, Al and alloys thereof, among which Li and it alloys are particularly preferred.

Where the present invention is applied in a secondary battery, a solution of an electrolyte in an organic solvent is used as the electrolyte. Examples of such an electrolyte include cations of metals having an electronegativity of 1.6 or less, organic cations and salts thereof with anions. Examples of onium ions include quaternary ammonium ions, carbonium ions and oxonium ions. Examples of the anions include $BF_4^-$, $ClO_4^-$, $PF_6^-$, $AsF_6^-$, $CF_3SO_3^-$, $I^-$, $Br^-$, $Cl^-$ and $F^-$. Particular examples of the electrolyte include lithium tetrafluoroborate ($LiBF_4$), lithium perchlorate ($LiClO_4$), lithium hexafluorophosphate ($LiPF_6$), lithium tetrachloroaluminate ($LiAlCl_4$), tetraethylammonium tetraluoroborate ($Et_4NBF_4$), tetra-n-butylammonium perchlorate ($nBu_4NClO_4$), lithium trifluoromethanesulfonate ($LiCF_3SO_3$), lithium iodide ($LiI$) and lithium bromide ($LiBr$), to which the electrolyte is, however, not limited. When, for example, a battery wherein the electrically conductive material according to the present invention is used in the anode and the cathode, while a solution of LiBF$_4$ is used as the electrolyte is in the process of being charged, the electrically conductive material in the anode is doped with BF$_4^-$ in the electrolyte, while that in the cathode is doped with Li$^+$ in the electrolyte. In contrast, when the battery is in the process of being discharged, BF$_4^-$ and Li$^+$ and Li$^+$ doped in the anode and the cathode, respectively, are released into the electrolyte.

An organic aprotic solvent having a high dielectric constant is preferably used as the solvent for dissolving therein the electrolyte. Such an organic solvent includes nitriles, carbonates, ethers, nitro compounds, amides, sulfur-containing compounds, chlorinated hydrocarbons, ketones, esters and so on. They may be used alone or in mixture. Representative examples of such an organic solvent include acetonitrile, propionitrile, butyronitrile, benzonitrile, propylene carbonate, ethylene carbonate, tetrahydrofuran, dioxolane, 1,4-dioxane, nitromethane, N,N-dimethylformamide, dimethyl sulfoxide, sulfolane, 1,2-dichloroethane, $\gamma$-butyrolactone, 1,2-dimethoxyethane, methyl phosphate and ethyl phosphate, to which the solvent is, however, not limited.

The concentration of the electrolyte solution used in the present invention is usually 0.001 to 10 mol/l, preferably 0.1 to 3 mol/l.

The electrolyte may be used either by pouring it or by incorporating it into an electrode using the electrically conductive material according to the present invention.

Although the foregoing description has been given to the method of forming an electrode without any doping treatment of an electrically conductive material, the electrically conductive material may be preliminarily doped with a dopant and molded alone or together with the above thermoplastic resin or the above other electrically conductive material into an electrode.

In the present invention, electrodes may be covered with drainboard-like or porous glass, Teflon, polyethylene, plate or the like in order to fix the electrodes in an electrolyte.

In the battery of the present invention, a filter paper of a glass fiber or a porous film of Teflon, polyethylene, polypropylene or nylon may be used as the separator.

DETAILED DESCRIPTION OF PREFERRED EMBODIMENTS

EXAMPLE 1

Figure 1:
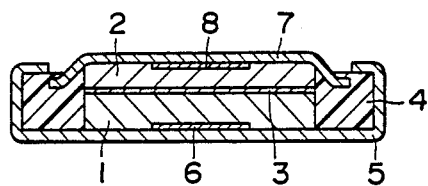
FIG. 1 is a crossectional view showing a structure of a battery according to the present invention.

8.0 g (0.12 mol) of pyrrole and 450 ml of acetonitrile were placed in a 1 liter round flask. A mixture comprising 189.7 g (0.36 mol) of a 45% aqueous solution of Cu(BF$_4$)$_2$ which had been prepared at a room temperature of 15° to 20° C. and 150 ml of acetonitrile was dropwise added to the flask over a period of 15 minutes, while stirring the content in a nitrogen atmosphere.

Heat generation occurred with the dropwise addition and the reaction mixture immediately turned black, while powdery solid separated out in the mixture, thus giving a slurry. After stirring for two hours, the reaction mixture was allowed to stand at a room temperature overnight. The resulting reaction mixture was filtered to obtain a black powdery product contaminated with a white crystalline substance. This product was washed with 600 ml of acetonitrile four times to remove the white crystalline substance. The obtained residue was dried in vacuum at 60° C. to obtain 12.4 g of a black powdery product.

The elemental analysis of this black powdery product revealed that it comprises 45.28% of C, 2.63% of H, 12.48% of N and 24.12% of F, which means that the product corresponds to C$_{4.0}$H$_{2.8}$N$_{0.95}$F$_{1.32}$ on the assumption that the number of carbon atoms is 4. Further, another analysis revealed that the copper content of the product is 0.001 on the same assumption. These results mean that the black powdery product is essentially an adduct of pyrrole with the anion moiety of Cu(BF$_4$)$_2$. The particle size of the primary particle constituting the black powder was determined with a scanning electron microscope. The average particle size thereof was 0.1 $\mu$m. The electric conductivity thereof as determined by the two terminal method was $1.2 \times 10^{-1}$ Scm$^{-1}$, which means that the obtained product is an organic semiconductor having a conductivity within a semiconductive range.

The above determination of electric conductivity was carried out as follows: The above black powder was sufficiently pulverized in a mortar and press-molded with a pressure of 5 t/cm$^2$ into a disk having a diameter of 10 mm. This disk sample was put between two copper cylinders having the same size and pressurized with a load of 1.2 kg from the upside. Leading wires taken out each of the upper and lower copper cylinders were connected to a digital multimeter (Takeda Riken TR 6851). The electric conductivity of the disk sample was determined with this multimeter.

The above polypyrrole disk had a press molding density of 1.4 g/cm$^3$ and was dense.

For comparison, 120.8 g (1.8 ml) of pyrrole was dropwise added to a homogeneous solution of 929.4 g of ferric perchlorate Fe(ClO$_4$)$_3$·9H$_2$O (as an oxidizing agent) in 7000 ml of water under stirring in a nitrogen atmosphere at room temperature to polymerize the pyrrole.

The obtained black powder comprised primary particles having an average particle size of 0.6 $\mu$m and was so bulk as to cause significant scattering. The polypyrrole molded product obtained by press molding the powder had a press molding density of 0.8 g/cm$^3$, while the electric conductivity thereof was $7.6 \times 10^{-2}$ Scm$^{-1}$.

EXAMPLE 2

The same procedure as that described in Example 1 was repeated except that 9.7 g of N-methylpyrrole was used instead of the pyrrole. Thus, 12.6 g of a black powdery product was obtained. On the basis of the elemental analysis thereof and on the assumption that the number of carbon atoms is 5, this product is estimated to be a substance corresponding to C$_{5.0}$H$_{5.1}$N$_{1.0}$F$_{1.12}$. This result means that the obtained product is essentially an adduct of N-methylpyrrole with the anion moiety of $Cu(BF_4)_2$. This black powder exhibited an electric conductivity of $4.2 \times 10^{-3}$ Scm$^{-1}$, while the primary particles thereof had an average size of 0.2 μm and the molded product thereof had a press molding density of 1.3 g/cm$^3$.

EXAMPLES 3 TO 11

The reactions between various pyrroles and various cupric compounds were carried out in a similar manner to that described in Example 1 to obtain powders of from dark brown to black. The powders were examined for characteristics and the results are shown in Table 1. In Examples using a solvent other than nitrile compounds, the used solvents are shown in Table 1.

EXAMPLES 12 TO 31

The reactions between various compounds having conjugated double bonds and various cupric compounds were carried out in a similar manner to that described in Example 1 to obtain powders of from dark brown to black. These powders are examined for characteristics and the results are shown in Table 2. In Examples using a solvent other than nitrile compounds, the used solvents are also shown in Table 2.

TABLE 1

| Preparative Example No. | Pyrrole compound | Cupric compound | Nitrile compound | Solvent | Electric conductivity (Scm$^{-1}$) | Press molding density (g/cm$^3$) | Average particle size (μm) |
|---|---|---|---|---|---|---|---|
| 3 | 1,3-dimethylpyrrole (N-CH$_3$, 3-CH$_3$) | $Cu(ClO_4)_2$ | $C_2H_5CN$ | — | $4.2 \times 10^{-3}$ | 1.4 | 0.3 |
| 4 | 3-methoxypyrrole (3-OCH$_3$, N-H) | $Cu(AsF_6)_2$ | $CH_3CN$ | — | $1.5 \times 10^{-1}$ | 1.3 | 0.25 |
| 5 | 3-phenylpyrrole (N-H) | $Cu(PF_6)_2$ | $C_6H_5CN$ | benzene | $2.2 \times 10^{-2}$ | 1.4 | 0.1 |
| 6 | 3-phenoxypyrrole (3-O-C$_6$H$_5$, N-H) | $Cu(CH_3C_6H_4SO_3)_2$ | $C_6H_5CN$ | toluene | $7.0 \times 10^{-2}$ | 1.4 | 0.15 |
| 7 | N-phenylpyrrole | $CuSiF_6$ | $OHCH_2CN$ | tetrahydrofuran | $6.2 \times 10^{-3}$ | 1.2 | 0.3 |
| 8 | 3-(dimethylamino)pyrrole (3-N(CH$_3$)$_2$, N-H) | $CuTiF_6$ | $C_3H_7CN$ | — | $4.5 \times 10^{-2}$ | 1.4 | 0.05 |

TABLE 1-continued

| Preparative Example No. | Pyrrole compound | Cupric compound | Nitrile compound | Solvent | Electric conductivity (Scm$^{-1}$) | Press molding density (g/cm$^3$) | Average particle size (μm) |
|---|---|---|---|---|---|---|---|
| 9 | 3-(N(C$_6$H$_5$)$_2$)-pyrrole (NH) | Cu(BF$_4$)$_2$ | CN(CH$_2$)$_4$CN | — | 6.9 × 10$^{-2}$ | 1.4 | 0.2 |
| 10 | 3,4-dimethylpyrrole (NH) | Cu(BF$_4$)$_2$ | CNCH$_2$COOH | — | 1.6 × 10$^{-1}$ | 1.3 | 0.2 |
| 11 | 3-phenyl-4-methylpyrrole (NH) | CuZrF$_6$ | CH$_2$=CHCN | — | 5.2 × 10$^{-1}$ | 1.3 | 0.1 |

TABLE 2

| Example No. | Compound having conjugated double bonds | Cupric compound | Nitrile compound | Solvent | Electric conductivity (Scm$^{-1}$) |
|---|---|---|---|---|---|
| 12 | thiophene | Cu(BF$_4$)$_2$ | CNCH$_2$COOH | — | 1.6 × 10$^{-1}$ |
| 13 | 3-methylthiophene | CuZrF$_6$ | CH$_2$=CHCN | — | 5.2 × 10$^{-1}$ |
| 14 | 3-ethoxythiophene | Cu(CF$_3$SO$_3$)$_2$ | CH$_2$=CHCN | — | 3.3 × 10$^{-2}$ |
| 15 | 3-phenylthiophene | Cu(BF$_4$)$_2$ | C$_6$H$_5$CN | benzene | 7.1 × 10$^{-2}$ |
| 16 | 3-phenoxythiophene | CuSiF$_6$ | C$_2$H$_5$CN | — | 1.1 × 10$^{-2}$ |
| 17 | 3-(N(CH$_3$)$_2$)thiophene | Cu(ClO$_4$)$_2$ | C$_6$H$_4$(CN)$_2$ | benzene | 1.0 × 10$^{-2}$ |

TABLE 2-continued

| Example No. | Compound having conjugated double bonds | Cupric compound | Nitrile compound | Solvent | Electric conductivity (Scm$^{-1}$) |
|---|---|---|---|---|---|
| 18 | 3-(N,N-diphenylamino)thiophene | Cu(BF$_4$)$_2$ | C$_3$H$_7$CN | — | 2.1 × 10$^{-2}$ |
| 19 | aniline | Cu(PF$_6$)$_2$ | CH$_3$CN | — | 3.6 × 10$^{-2}$ |
| 20 | 2-ethylaniline | Cu(ClO$_4$)$_2$ | OH(CH$_2$)$_2$CN | methanol | 5.5 × 10$^{-3}$ |
| 21 | 4-aminobiphenyl | Cu(BF$_4$)$_2$ | CH$_3$CN | — | 8.2 × 10$^{-3}$ |
| 22 | 4-phenoxyaniline | Cu(BF$_4$)$_2$ | CH$_2$(CN)$_2$ | toluene | 4.6 × 10$^{-3}$ |
| 23 | 2-methoxyaniline | Cu(BF$_4$)$_2$ | CH$_3$OCH$_2$CN | tetrahydrofuran | 4.8 × 10$^{-2}$ |
| 24 | 4-amino-triphenylamine | Cu(ClO$_4$)$_2$ | C$_6$H$_3$(CN)$_3$ | toluene | 7.5 × 10$^{-2}$ |

TABLE 2-continued

| Example No. | Compound having conjugated double bonds | Cupric compound | Nitrile compound | Solvent | Electric conductivity (Scm$^{-1}$) |
|---|---|---|---|---|---|
| 25 | (phenyl-N(CH$_3$)-phenyl-NH$_2$) | Cu(AsF$_6$)$_2$ | CH$_3$CN | — | $1.6 \times 10^{-2}$ |
| 26 | (phenyl-NH-phenyl-NH$_2$) | CuSiF$_6$ | CN(CH$_2$)$_2$COOH | acetic acid | $1.9 \times 10^{-1}$ |
| 27 | (3-methyl-2,2'-bithiophene) | CuZrF$_6$ | CH$_3$CH | — | $2.6 \times 10^{-2}$ |
| 28 | (terthiophene) | Cu(BF$_4$)$_2$ | C$_3$H$_7$CN | — | $6.9 \times 10^{-3}$ |
| 29 | (3-methoxy-2,2'-bithiophene) | Cu(BF$_4$)$_2$ | C$_6$H$_5$CN | toluene | $4.2 \times 10^{-2}$ |
| 30 | (3-phenyl-2,2'-bithiophene) | Cu(ClO$_4$)$_2$ | CNCH$_2$COOH | — | $3.3 \times 10^{-2}$ |
| 31 | (3-dimethylamino-2,2'-bithiophene) | CuSiF$_6$ | CH$_3$CN | — | $6.2 \times 10^{-2}$ |

EXAMPLE 32

2.68 g (0.04 mol) of pyrrole and 150 ml of acetonitrile were placed in a 1 liter round flask. A mixture comprising 63.2 g (0.12 mol) of a 45% aqueous solution of Cu(BF$_4$)$_2$ which had been prepared at a room temperature of 15° to 20° C. and 50 ml of acetonitrile was dropwise added to the flask over a period of 15 minutes, while stirring the content in a nitrogen atmosphere.

Heat generation occurred with the dropwise addition and the reaction mixture immediately turned black, while a powdery solid separated out in the mixture, thus giving a slurry. The slurry was stirred for 2.5 hours and filtered to obtain a black powdery product contaminated with a white crystalline substance. This contaminated product was washed with 150 ml of acetonitrile four times to remove the white crystalline substance. The resulting product was dried in vaccuo at 60° C. to obtain 3.9 g of a black powder.

The elemental analysis of this black powder revealed that it comprises 45.28% of C, 2.63% of H, 12.48% of N and 24.12% of F, which means that the powder is a substance corresponding to C$_{4.0}$H$_{2.8}$N$_{1.0}$F$_{1.32}$ on the assumption that the number of carbon atoms is 4.0.

Further, another analysis revealed that the copper content of the powder is 0.001 on the same assumption. These results mean that the black powder essentially comprises an adduct of pyrrole with the anion moiety of $Cu(BF_4)_2$.

The electric conductivity of the black powder as determined by the two terminal method was 2.0 $Scm^{-1}$, which means that the obtained powder is an organic conductor having a high electric conductivity.

The above determination of electric conductivity was carried out as follows:

The above black powder was sufficiently pulverized in a mortar and press-molded with a pressure of 5 $t/cm^2$ into a disk having a diameter of 10 mm. This disk sample was put between two copper cylinders having the same size and pressurized with a load of 1.2 kg from the upside. Leading wires taken out each of the upper and lower copper cylinders were connected to a digital multimeter (Takeda Riken TR 6851). The electric conductivity of the disk sample was determined with this multimeter.

The filtrate obtained by the above filtration of the reaction mixture was combined with the wash liquids. The obtained mixture was evaporated with a rotary evaporator to remove the acetonitrile, thus giving a white crystal.

150 ml of acetonitrile and 10 ml of a 42% aqueous solution of hydroborofluoric acid were added to this white crystal. Air was bubbled into the obtained mixture at 60° C. under stirring with a magnetic stirrer for 30 minutes. The crystal was dissolved to give a Nile blue solution. Additionally, air was bubbled into the solution for 2 hours to continue the oxidation.

The solution thus obtained was dropwise added to a solution of 2.68 g (0.04 mol) of pyrrole in 50 ml of acetonitrile at a room temperature under stirring in a nitrogen atmosphere. Immediately after the dropwise addition, the reaction mixture turned black, by which the proceeding of the polymerization of pyrrole was confirmed. After stirring for 2.5 hours, the reaction mixture was filtered and the reaction product was washed with 150 ml of acetonitrile four times and dried in vacuum at 60° C. to obtain 3.5 g of a black powder.

The elemental analysis of this powder revealed that the powder comprises 49.15% of C, 2.98% of H, 14.30% of N and 19.66% of F, which means that the powder is a substance corresponding to $C_{4.0}H_{2.9}N_{1.0}F_{1.00}$ on the assumption that the number of carbon atoms is 4. The black powder exhibited an electric conductivity of 4.2 $Scm^{-1}$.

For comparison, the above acetonitrile solution containing a white crystalline substance was as such reacted with pyrrole without bubbling air thereinto. No black product was obtained at all.

It was confirmed from the above results that the continuous production of polypyrrole from pyrrole can be carried out by bubbling air into the reaction residue to regenerate the cuprous compound contained therein into the cupric compound and using the cupric compound as an oxidizing agent in the following reaction.

EXAMPLE 33

The same procedure as that described in Example 32 was repeated except that 3.2 g of N-methylpyrrole was used instead of the pyrrole to obtain 4.2 g of a black powdery product. This product was estimated to be a substance corresponding to $C_{5.0}H_{5.1}N_{1.0}F_{1.12}$ on the basis of the results of the elemental analysis thereof and on the assumption that the number of carbon atoms is 5.0, which means that the obtained powdery product is essentially an adduct of N-methylpyrrole with the anion moiety of $Cu(BF_4)_2$. The black product exhibited an electric conductivity of $3.6 \times 10^{-2}$ $Scm^{-1}$.

The filtrate obtained by the filtration of the reaction mixture was combined with the wash liquids and the obtained mixture was subjected to oxidative regeneration by air bubbling in a similar manner to that described in Example 32. 3.2 g of N-methylpyrrole was added to the regenerated solution. A black product was immediately formed.

The reaction was continued for 2.5 hours, followed by the same post-treatment as that described in Example 1, i.e., filtration, washing and drying in vacuum. 4.0 g of a black powder was obtained. This black powder exhibited an electric conductivity of $1.8 \times 10^{-2}$ $Scm^{-1}$ and was estimated based on the results the elemental analysis to be a substance corresponding to $C_{5.0}H_{5.0}N_{1.0}F_{1.10}$.

EXAMPLE 34 TO 60

Electrically conductive materials were produced by reacting various compounds having conjugated double bonds with various cupric compounds in the presence of various nitrile compounds. The residue obtained by removing the electrically conductive material from the reaction mixture were each subjected to the same oxidative regeneration as that described in Example 32 and again reacted with compounds having conjugated double bonds. The results are shown in Table 3.

TABLE 3

| Example No. | Compound having conjugated double bonds | Cupric compound | Nitrile compound | Solvent | Electric conductivity ($Scm^{-1}$) |
| --- | --- | --- | --- | --- | --- |
| 34 | 3-methyl-1-methylpyrrole | $Cu(ClO_4)_2$ | $C_2H_5CN$ | — | $3.8 \times 10^{-3}$ |
| 35 | 3-methoxypyrrole | $Cu(AsF_6)_2$ | $CH_3CN$ | — | $4.6 \times 10^{-1}$ |

TABLE 3-continued

| Example No. | Compound having conjugated double bonds | Cupric compound | Nitrile compound | Solvent | Electric conductivity (Scm$^{-1}$) |
|---|---|---|---|---|---|
| 36 | 3-phenylpyrrole | Cu(PF$_6$)$_2$ | C$_6$H$_5$CH | benzene | 7.7 × 10$^{-2}$ |
| 37 | 3-phenoxypyrrole | Cu(CH$_3$C$_6$H$_4$SO$_3$)$_2$ | C$_6$H$_5$CN | toluene | 8.2 × 10$^{-2}$ |
| 38 | 1-phenylpyrrole | CuSiF$_6$ | OHCH$_2$CN | tetrahydrofuran | 5.5 × 10$^{-3}$ |
| 39 | 3-(N,N-dimethylamino)pyrrole | CuTiF$_6$ | C$_3$H$_7$CN | — | 1.8 × 10$^{-2}$ |
| 40 | 3-(N,N-diphenylamino)pyrrole | Cu(BF$_4$)$_2$ | CN(CH$_2$)$_4$CN | — | 2.6 × 10$^{-2}$ |
| 41 | thiophene | Cu(BF$_4$)$_2$ | CNCH$_2$COOH | — | 1.0 × 10$^{-1}$ |
| 42 | 3-methylthiophene | CuZrF$_6$ | CH$_2$=CHCN | — | 4.5 × 10$^{-1}$ |
| 43 | 3-ethoxythiophene | Cu(CF$_3$SO$_3$)$_2$ | CH$_2$=CHCN | — | 4.0 × 10$^{-2}$ |
| 44 | 3-phenylthiophene | Cu(BF$_4$)$_2$ | C$_6$H$_5$CN | benzene | 6.5 × 10$^{-2}$ |

TABLE 3-continued

| Example No. | Compound having conjugated double bonds | Cupric compound | Nitrile compound | Solvent | Electric conductivity $(Scm^{-1})$ |
|---|---|---|---|---|---|
| 45 | 3-phenoxythiophene | $CuSiF_6$ | $C_2H_5CN$ | — | $1.5 \times 10^{-2}$ |
| 46 | 3-(dimethylamino)thiophene | $Cu(ClO_4)_2$ | $C_6H_4(CN)_2$ | benzene | $1.5 \times 10^{-2}$ |
| 47 | 3-(diphenylamino)thiophene | $Cu(BF_4)_2$ | $C_3H_7CN$ | — | $2.0 \times 10^{-2}$ |
| 48 | aniline | $Cu(PF_6)_2$ | $CH_3CN$ | — | $4.0 \times 10^{-2}$ |
| 49 | 2-ethylaniline | $Cu(ClO_4)_2$ | $OH(CH_2)_2CN$ | methanol | $5.5 \times 10^{-3}$ |
| 50 | 4-aminobiphenyl | $Cu(BF_4)_2$ | $CH_3CN$ | — | $9.0 \times 10^{-3}$ |
| 51 | 4-phenoxyaniline | $Cu(BF_4)_2$ | $CH_2(CN)_2$ | toluene | $4.0 \times 10^{-3}$ |
| 52 | 2-methoxyaniline | $Cu(BF_4)_2$ | $CH_3OCH_2CN$ | tetrahydrofuran | $4.5 \times 10^{-2}$ |

TABLE 3-continued

| Example No. | Compound having conjugated double bonds | Cupric compound | Nitrile compound | Solvent | Electric conductivity (Scm$^{-1}$) |
|---|---|---|---|---|---|
| 53 | (diphenylamino)aniline: Ph$_2$N-C$_6$H$_4$-NH$_2$ | Cu(ClO$_4$)$_2$ | C$_6$H$_3$(CN)$_3$ | toluene | $6.5 \times 10^{-2}$ |
| 54 | N-methyl-N-phenyl-p-phenylenediamine | Cu(AsF$_6$)$_2$ | CH$_3$CN | — | $1.0 \times 10^{-2}$ |
| 55 | N-phenyl-p-phenylenediamine | CuSiF$_6$ | CN(CH$_2$)$_2$COOH | acetic acid | $2.0 \times 10^{-1}$ |
| 56 | 3-methyl-2,2'-bithiophene | CuZrF$_6$ | CH$_3$CN | — | $2.7 \times 10^{-2}$ |
| 57 | 2,2':5',2''-terthiophene | Cu(BF$_4$)$_2$ | C$_3$H$_7$CN | — | $6.3 \times 10^{-3}$ |
| 58 | 3-methoxy-2,2'-bithiophene | Cu(BF$_4$)$_2$ | C$_6$H$_5$CN | toluene | $4.5 \times 10^{-2}$ |
| 59 | 3-phenyl-2,2'-bithiophene | Cu(ClO$_4$)$_2$ | CNCH$_2$COOH | — | $4.0 \times 10^{-2}$ |
| 60 | 3-dimethylamino-2,2'-bithiophene | CuSiF$_6$ | CH$_3$CN | — | $4.8 \times 10^{-2}$ |

In Examples using a solvent other than nitrile compounds, the used solvent is also shown in Table 3.

Now, Examples of batteries using the electrically conductive materials prepared in the above Examples will be described.

EXAMPLE 61

The electrically conductive material prepared in Example 1 was mixed with acetylene black (conductor) and polytetrafluoroethylene (binder) at a weight ratio of 85:10:5. The obtained mixture was press-molded into a disk and this disk was used as an anode. On the other hand, lithium punched into a predetermined size was used as a cathode.

A battery (Battery A) according to the present invention as shown in FIG. 1 was produced by assembling a cathode part wherein the cathode 2 above-prepared was contact-bonded to the bottom of a cathode case 7 via a cathode collector 8 to an anode part wherein the anode 1 above-prepared is contact-bonded to the bottom of an anode case 5 via an anode collector 6 via a separator 3 made of nonwoven polypropylene fabric and using a solution of lithium borofluoride (electrolyte) in propylene carbonate (solvent) as an electrolytic solution. In FIG. 1, the numeral 4 is an insulating gasket.

Another battery (Battery B) according to the present invention was produced by the same method as that used in the production of Battery A except that a disk obtained by pressmolding a mixture comprising the electrically conductive material prepared in Example 2, acetylene black and poltetrafluoroethylene at a weight ratio of 85:10:5 was used as anode.

Still, another battery (Battery C) according to the present invention was produced by the same method as that used in the production of Battery A except that a disk obtained by press-molding a mixture comprising the electrically conductive material prepared in Example 28, acetylene black and polytetrafluoroethylene at a weight ratio of 85:10:5 was used as an anode, while another battery (Battery D) was also produced by the same method as that used in the production of Battery A except that a disk obtained by press-molding a mixture comprising the electrically conductive material prepared in Example 29, acetylene black and polytetrafluoroethylene at a weight ratio of 85:10:5 was used as an anode.

On the other hand, a battery for comparison (Comparative Battery E) was produced by the same method as that used in the production of Battery A except that a disk obtained by press-molding a mixture comprising polyacetylene powder (anode material), acetylene black and polytetrafluoroethylene at a weight ratio of 85:10:5 was used as an anode. The polyacetylene used had a press molding density of 0.95 g/cm$^3$.

Another battery for comparison (Comparative Battery F) was produced as follows:

40.6 g (0.15 mol) of FeCl$_3$.6H$_2$O was placed in a 500 ml round flask, followed by the addition of 300 ml of desalted water. The mixture was stirred in a nitrogen atmosphere to obtain an aqueous solution. 101 g of pyrrole was dropwise added to this aqueous solution at a room temperature (25° C.) in a nitrogen atmosphere. The obtained mixture was stirred for 6 hours and allowed to stand at room temperature for one day. A black powdery precipitate was observed in the lower part of the reaction mixture. The reaction mixture was filtered. The obtained filter cake was washed with 200 ml of methanol 3 times, 200 ml of water 2 times, 200 ml of toluene 2 times and 200 ml of methanol 2 times successively and dried in vacuum at 60° C. to obtain a black powdery product. The average particle size of primary particle of the powdery product was 0.6 μm, so that the product was so bulk as to cause significant scattering. Further, the powdery product gave a molded product having a density of 0.8 g/cm$^3$ by press molding.

Another battery for comparison (Comparative Battery F) was produced by the same method as that used in the production of Battery A except that a disk obtained by press-molding a mixture comprising the electrically conductive material (polypyrrole) prepared by the above chemical polymerization using ferric chloride as an oxidizing agent, acetylene black and polytetrafluoroethylene at a weight ratio of 85:10:5 was used an anode.

The above six batteries were examined for variation in charging and discharging efficiency (%) with number of cycles by repeating a cycle comprising charging the batteries at a current of 1 mA for 5 hours and discharging them at a current of 1 mA until the voltage of the batteries became 2.5 V. The results are shown in FIG. 2.

Figure 2:
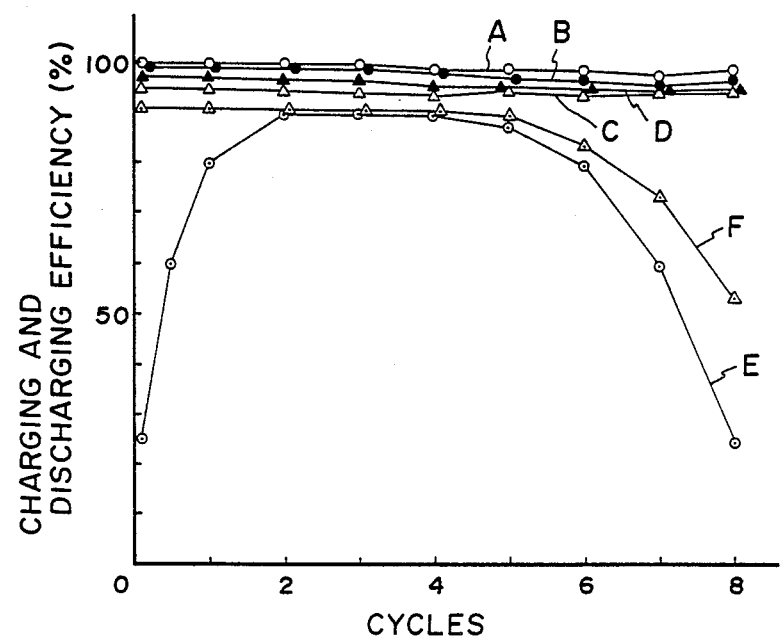
FIG. 2 is a graph showing the cycling characteristics of batteries according to the present invention and comparative batteries.

It is apparent from the results shown in FIG. 2 that Batteries A, B, C and D according to the present invention each maintained a high charging and discharging efficiency from the beginning of the cycling, while Comparative Battery E exhibited a low charging and discharging efficiency until near the 20th cycle. The reason why Batteries A, B, C and D according to the present invention each exhibited a high charging and discharging efficiency from the beginning of the cycling is estimated to be that the electrically conductive materials prepared in Examples 1, 2, 28 and 29 were preliminarily doped with tetrafluoroborate ion (BF$_4^-$). Comparative Battery F exhibited a charging and discharging efficiency inferior to that of Battery A, B, C or D, though it maintained a relatively high charging and discharging efficiency from the beginning of the cycling which is because the ion doped in the electrically conductive material was not tetrafluoroborate ion (BF$_4^-$) but chloride ion (Cl$^-$).

Further, it is also understood from the results that Batteries A, B, C and D according to the present invention each maintained their charging and discharging efficiencies on a high level of 90% or above even when the number of cycles exceeded 80, while Comparative Battery E exhibited an extreme drop in charging and discharging efficiency when the number of cycles exceeded about 50. In the 80th cycle, the charging and discharging efficiencies of Batteries A, B, C and D were 99%, 97%, 95% and 96% respectively, while those of Comparative Batteries E and F were 25% and 55%, respectively. The reason why the cycling characteristics of Comparative Battery E was so poor is estimated to be because the polyacetylene powder used as an anode material was determined with water and oxygen which were adsorbed by the polyacetylene powder or adhered to it or with dissolved oxygen and a trace of water contained in the electrolyte. On the other hand, the reason why Batteries A, B, C and D according to the present invention exhibited excellent cycling characteristics is estimated to be because they each used, as an anode material, an electrically conductive material which is so excellent in oxidation resistance as not to be deteriorated with dissolved oxygen and a trace of water contained in the electrolyte. Further, the reason why Comparative Battery F exhibited poor cycling characteristics is estimated to be because the used polypyrrole anode material prepared by the chemical oxidation polymerization according to the prior art contained therein chloride ion Cl⁻ as a dopant, so that chlorine gas was generated during the cycling to cause the reaction between the chlorine gas and the cathode. Batteries A, B, C and D according to the present invention used, as an anode material, a polymer which exhibits an excellent electric conductivity and has no possibility of generating chlorine gas during the cyling, so that they exhibited excellent cycling characteristics without causing such a side reaction as described above in the cathode.

The electrically conductive materials used in Batteries A, B, C and D according to the present invention have so sufficiently small average particle sizes of 0.1 μm and 0.2 μm respectively that they each exhibit a high electrolyte incorporating power. Further, they can give a high-density molded product, so that they exhibit excellent packing properties in a battery, thus giving an electrode having a high electric conductivity. Therefore, in the case wherein Batteries A and B and Comparative Battery D are produced by using electrodes each having a volume equal to each other, Batteries A and B each exhibit a slight increase in voltage when the batteries are charged, so that they hardly cause side reactions such as decomposition of a solvent of an electrolyte, separation of a dopant or corrosion of battery case materials. On the other hand, in Comparative Battery D, an electrically conductive material, which has an average particle size of about 0.6 μm which is larger than that of the material used in the production of Batteries A and B and give a molded product having a low density of 0.8 g/cm³, therefore being poor in packing properties in a battery, is used as an electrode material, so that the obtained electrode itself is poor in electric conductivity. Therefore, when Comparative Battery D is charged on the same level of capacity as that of Battery A or B, it exhibits a significant increase in voltage to cause side reactions such as decomposition of a solvent of an electrolyte, separation of a dopant or corrosion of battery case materials, which adversely affects the cycling characteristic of Comparative Battery D.

Figure 3:
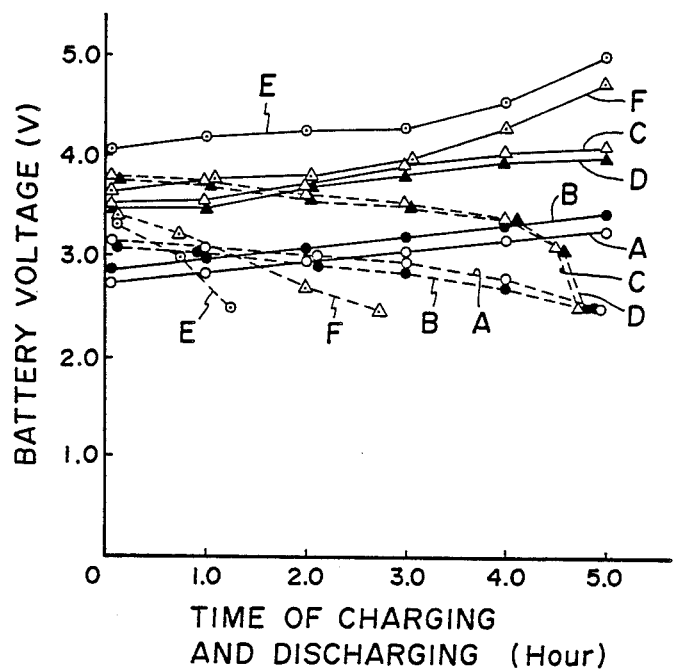
FIG. 3 is a graph showing variation in voltage of batteries according to the present invention and comparative batteries with time during the course of charging and discharging in their 80th cycle and FIG. 4 is a graph showing self-discharging characteristics of batteries according to the present invention and comparative batteries.

FIG. 3 shows variations in voltage of the batteries with time during the course of charging and discharging in their 80th cycle, wherein full lines are those during the course of charging, while dotted lines are those during the course of discharging. It can be understood from the results shown in FIG. 1 that Batteries A, B, C and D according to the present invention do not exhibit a rapid increase in voltage at the beginning of charging and are superior to Comparative Batteries E and F in flatness of voltage during the course of discharging.

Figure 4:
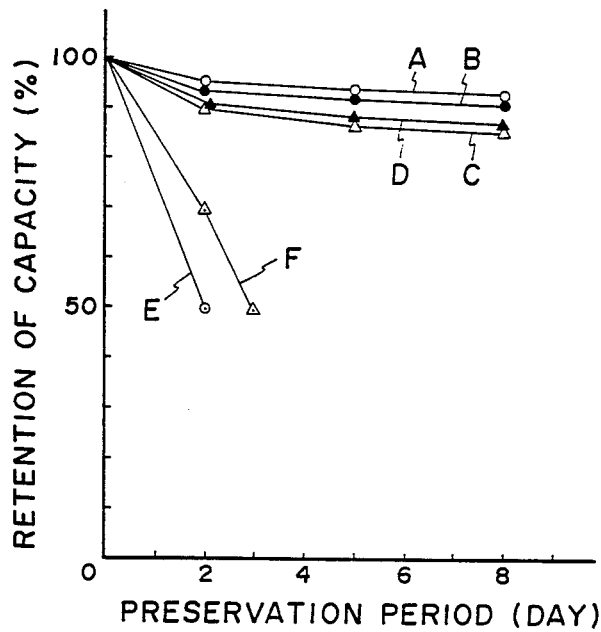

FIG. 4 shows a self-discharging characteristics of batteries during their preservation. It can be understood from the results shown in FIG. 4 that Batteries A, B, C and D according to the present invention exhibit self-discharging slighter than that of Comparative Batteries E and F, which means that the former is superior to the latter in preservability. The reason why Batteries A, B, C and D exhibit better preservability than that of Comparative Battery E is estimated to be because the electrically conductive materials used in Batteries A, B, C and D as an anode material are so excellent in oxidation resisitance as not to be deteriorated with dissolved oxygen or a trace of water contained in their electrolyte. In Comparative Battery F using an anode material preliminarily doped with chloride ion, the preservability of this dopant itself is poor and a small amount of chloride gas is generated during the course of charging. Therefore, Comparative Battery F exhibits significant self-discharging, thus being poor in preservability. On the other hand, Batteries A, B, C and D according to the present invention hardly contain impurities (such as chloride ion) which adversely affect their preservability, so that they exhibit preservability remarkably better than that of Comparative Battery F.

Although the foregoing description has been given to the battery using the electrically conductive material of the present invention only as an anode material, it is apparent that a battery using the electrically conductive material as its cathode material or as both its cathode material and its anode material also exhibits similar effects.

What is claimed is:

1. A process for the preparation of an electrically conductive material comprising a polymer having conjugated double bonds which comprises reacting a compound having conjugated double bonds with an oxidizing agent comprising a cupric compound and a nitrile compound.

2. The process for the preparation of an electrically conductive material as set forth in claim 1, wherein the cuprous compound-containing residue obtained by removing the electrically conductive material from the reaction mixture is subjected to oxidation to convert the cuprous compound into the corresponding cupric compound, and the cupric compound is recycled and reused in the reaction.

3. The process for the preparation of an electrically conductive material as set forth in claim 1, wherein said cupric compound is a compound represented by the general formula:

$$CuX_m$$

wherein X stands for $ClO_4^-$, $BF_4^-$, $AsF_6^-$, $PF_6^-$, $SbF_6^-$, $CH_3C_6H_4SO_3^-$, $CF_3SO_3^-$, $ZrF_6^{--}$, $TiF_6^{--}$ or $SiF_6^{--}$ and m stands for an integer of 1 to 2.

4. The process for the preparation of an electrically conductive material as set forth in claim 1, wherein said nitrile compound is a compound represented by the general formula:

$$R(CN)n$$

wherein R stands for an alkyl, alkenyl or aryl group which may be substituted and n stands for an integer of 1 to 3.

5. The process for the preparation of an electrically conductive material as set forth in claim 1, wherein said compound having conjugated double bonds is a thiophene or pyrrole compound represented by the general formula:

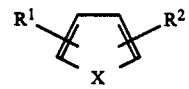

wherein $R^1$ and $R^2$ each stand for a hydrogen atom or an alkyl, alkoxy, aryl, aryloxy, amino, alkylamino or arylamino group; X stands for S or $NR^3$ and $R^3$ stands for a hydrogen atom or an alkyl or aryl group.

6. The process for the preparation of an electrically conductive material as set forth in claim 1, wherein said compound having conjugated double bonds is an aniline compound represented by the general formula:

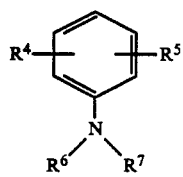

wherein $R^4$ and $R^5$ each stand for a hydrogen atom or an alkyl, alkoxy, aryl, aryloxy, amino, alkylamino or arylamino group and $R^6$ and $R^7$ each stand for a hydrogen atom or an alkyl or aryl group.

7. The process for the preparation of an electrically conductive material as set forth in claim 1, wherein said compound having conjugated double bonds is a bi- or ter-thiophene compound represented by the general formula:

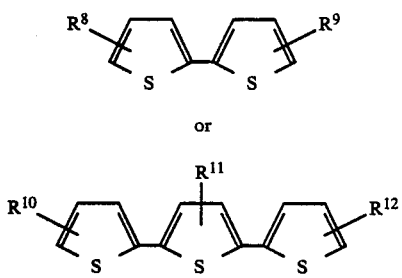

wherein $R^8$, $R^9$, $R^{10}$, $R^{11}$ and $R^{12}$ each stand for hydrogen atom or an alkyl, alkoxy, aryl, aryloxy, amino, alkylamino or arylamino group.

8. The process for the preparation of an electrically conductive material as set forth in claim 1, wherein the product obtained by the reaction between said compound having conjugated double bonds and said oxidizing agent is purified with a liquid nitrile compound.

9. An electrically conductive material comprising grainy polypyrrole, wherein said electrically conductive material is a product obtained by reacting a pyrrole compound represented by the general formula:

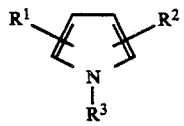

wherein $R^1$ and $R^2$ each stand for a hydrogen atom or an alkyl, alkoxy, aryl, aryloxy, amino, alkylamino or arylamino group and $R^3$ stands for a hydrogen atom or an alkyl or aryl group
with an oxidizing agent which is constituted by primary particles having an average particle size of 0.01 to 0.4 μm and a press molding density of 1 to 1.6 g/cm³ comprising a cupric compound represented by the general formula:

CuXm wherein X stands for $ClO_4^-$, $BF_4^-$, $AsF_6^-$, $PF_6^-$, $SbF_6^-$, $CH_3C_6H_4SO_3^-$, $CF_3SO_3^-$, $ZrF_6^{--}$, $TiF_6^{--}$ or $SiF_6^{--}$ and m stands for an integer of 1 to 2 and a nitrile compound represented by the general formula

R(CN)n wherein R stands for an alkyl, alkenyl or aryl group which may be substituted with n stands for an integer of 1 to 3.

10. A secondary battery using an electrically conductive material obtained by reacting a compound having conjugated double bonds with an oxidizing agent as at least one of the cathode and the anode, wherein said oxidizing agent comprises a cupric compound and a nitrile compound.

11. The secondary battery as set forth in claim 10, wherein said compound having conjugated double bonds is a thiophene or pyrrole compound represented by the general formula:

wherein $R^1$ and $R^2$ each stand for a hydrogen atom or an alkyl, alkoxy, aryl, aryloxy, amino, alkylamino or arylamino group; X stands for S or $NR^3$ and $R^3$ stands for a hydrogen atom or an alkyl or aryl group.

12. The secondary battery as set forth in claim 10, wherein said compound having conjugated double bonds is an aniline compound represented by the general formula:

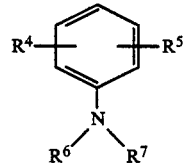

wherein $R^4$ and $R^5$ each stand for a hydrogen atom or an alkyl, alkoxy, aryl, aryloxy, amino, alkylamino or arylamino group and $R^6$ and $R^7$ each stand for a hydrogen atom or an alkyl or aryl group.

13. The secondary battery as set forth in claim 10, wherein said compound having conjugated double bonds is a bi- or ter-thiophene compound represented by the general formula:

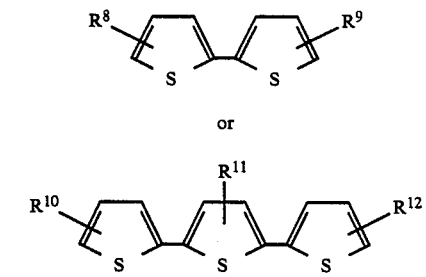

wherein $R^8$, $R^9$, $R^{10}$, $R^{11}$ and $R^{12}$ each stand for a hydrogen atom or an alkyl, alkoxy, aryl, aryloxy, amino, alkylamino or arylamino group.

14. The secondary battery as set forth in claim 10, wherein said electrically conductive material is purified with a liquid nitrile compound prior to the use thereof as one of the cathode and the anode.

15. A secondary battery including as at least one of the anode and the cathode, an electrically conductive material comprising a grainy polymer prepared by reacting a pyrrole compound represented by the general formula:

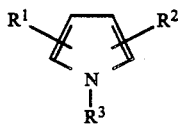

wherein $R^1$ and $R^2$ each stand for a hydrogen atom or an alkyl, alkoxy, aryl, aryloxy, amino, alkylamino or arylamino group and $R^3$ stands for a hydrogen atom or an alkyl or aryl group
with an oxidizing agent which is constituted by primary particles having an average particle size of 0.01 to 0.4 μm and a press molding density of 1 to 1.6 g/cm$^3$ comprising a cupric compound represented by the general formula:

$$CuX_m$$

wherein X stands for $ClO_4{}^-$, $BF_4{}^-$, $AsF_6{}^-$, $PF_6{}^-$, $SbF_6{}^-$, $CH_3C_6H_4SO_3{}^-$, $CF_3SO_3{}^-$, $ZrF_6{}^{--}$, $TiF_6{}^{--}$ or $SiF_6{}^{--}$ and m stands for an integer of 1 to 2
and a nitrile compound represented by the general formula $$R(CN)n$$

wherein R stands for an alkyl, alkenyl or aryl group which may be substituted and n stands for an integer of 1 to 3.

* * * * *

UNITED STATES PATENT AND TRADEMARK OFFICE
CERTIFICATE OF CORRECTION

PATENT NO. : 4,795,687
DATED : 1/03/89
INVENTOR(S) : Tetsumi SUZUKI, Kazumi HASEGAWA, Osamu ANDO, Nobuhiro FURUKAWA, Koji NISHIO It is certified that error appears in the above-identified patent and that said Letters Patent is hereby corrected as shown below:

Title page:

Please correct the Assignment information as follows:

[73]   Assignee:   -- Sanyo Electric Co., Ltd., Osaka, Japan, and Mitsubishi Kasei Corporation, Tokyo, Japan--

Signed and Sealed this

Eleventh Day of July, 1989

Attest:

DONALD J. QUIGG

Attesting Officer

Commissioner of Patents and Trademarks